(12) United States Patent
Qiu

(10) Patent No.: US 9,067,372 B2
(45) Date of Patent: Jun. 30, 2015

(54) LENS MOLDS HAVING ATMOSPHERIC PLASMA COATINGS THEREON

(75) Inventor: Yongxing Qiu, Duluth, GA (US)

(73) Assignee: Novartis AG, Basel (CH)

( * ) Notice: Subject to any disclaimer, the term of this patent is extended or adjusted under 35 U.S.C. 154(b) by 841 days.

(21) Appl. No.: 13/303,190

(22) Filed: Nov. 23, 2011

(65) Prior Publication Data

US 2012/0139137 A1    Jun. 7, 2012

Related U.S. Application Data

(60) Provisional application No. 61/418,533, filed on Dec. 1, 2010.

(51) Int. Cl.
*B29D 11/00*    (2006.01)

(52) U.S. Cl.
CPC .... *B29D 11/00038* (2013.01); *B29D 11/00865* (2013.01)

(58) Field of Classification Search
USPC .............................. 264/1.1, 1.36, 2.5; 425/808
IPC .................................. B29D 11/00038,11/00865
See application file for complete search history.

(56) References Cited

U.S. PATENT DOCUMENTS

| | | |
|---|---|---|
| 2,936,222 A | 5/1960 | Stevens |
| 3,008,920 A | 11/1961 | Urchick |
| 3,070,573 A | 12/1962 | Beck |
| 3,854,982 A | 12/1974 | Aelion |
| 4,032,440 A | 6/1977 | Yasuda |
| 4,137,550 A | 1/1979 | Kaganowicz |
| 4,159,292 A | 6/1979 | Neefe |
| 4,311,573 A | 1/1982 | Mayhan |
| 4,312,575 A | 1/1982 | Peyman |
| 4,444,711 A | 4/1984 | Schad |
| 4,460,534 A | 7/1984 | Boehm |
| 4,468,229 A | 8/1984 | Su |
| 4,501,805 A | 2/1985 | Yasuda |
| 4,503,133 A | 3/1985 | van Lier |

(Continued)

FOREIGN PATENT DOCUMENTS

| | | |
|---|---|---|
| CA | 2139019 A1 | 6/1995 |
| EP | 0367513 A2 | 5/1990 |

(Continued)

OTHER PUBLICATIONS

PCT International Search Report dated Feb. 7, 2012, International Application No. PCT/US2011/061982, International Filing Date Nov. 23, 2011.

(Continued)

*Primary Examiner* — Mathieu Vargot
(74) *Attorney, Agent, or Firm* — Jian Zhou

(57) ABSTRACT

The invention provides a method of making ophthalmic lenses with an enhanced quality and enhanced yield achieved by reducing mold separation force and lens-mold adhesion. The method comprises the steps of generating an atmospheric plasma flow from a working gas and controlling the continuity of the atmospheric plasma flow with a power generator, and, introducing the atmospheric plasma flow to a molding surface of a mold for making an ophthalmic lens (preferably contact lens, more preferably a silicone hydrogel contact lens) and increasing the surface hydrophobicity of the molding surface of the mold and thereby to reduce a mold separation force after molding a lens formulation in the mold.

20 Claims, 4 Drawing Sheets

(56) References Cited

U.S. PATENT DOCUMENTS

| | | |
|---|---|---|
| 4,534,916 A | 8/1985 | Wichterle |
| 4,553,975 A | 11/1985 | Su |
| 4,559,059 A | 12/1985 | Su |
| 4,589,964 A | 5/1986 | Mayhan |
| 4,632,844 A | 12/1986 | Yanagihara |
| 4,664,936 A | 5/1987 | Ueno |
| 4,692,347 A | 9/1987 | Yasuda |
| 4,749,457 A | 6/1988 | Yasuda |
| 4,752,426 A | 6/1988 | Cho |
| 4,761,436 A | 8/1988 | Kohno |
| 4,929,707 A | 5/1990 | Nagata |
| 4,946,923 A | 8/1990 | Nagata |
| 4,948,485 A | 8/1990 | Wallstén |
| 4,968,532 A | 11/1990 | Janssen |
| 4,980,196 A | 12/1990 | Yasuda |
| 4,994,298 A | 2/1991 | Yasuda |
| 5,013,496 A | 5/1991 | Nagata |
| 5,021,503 A | 6/1991 | Nagata |
| 5,126,388 A | 6/1992 | Nagata |
| 5,158,718 A | 10/1992 | Thakrar |
| 5,176,938 A | 1/1993 | Wallstén |
| 5,182,000 A | 1/1993 | Antonelli |
| 5,264,161 A | 11/1993 | Druskis |
| 5,267,390 A | 12/1993 | Yang |
| 5,270,082 A | 12/1993 | Lin |
| 5,278,384 A | 1/1994 | Matsuzawa |
| 5,312,529 A | 5/1994 | Antonelli |
| 5,508,317 A | 4/1996 | Müller |
| 5,542,978 A | 8/1996 | Kindt-Larsen |
| 5,583,163 A | 12/1996 | Müller |
| 5,594,088 A | 1/1997 | Nagata |
| 5,690,865 A | 11/1997 | Kindt-Larsen |
| 5,753,730 A | 5/1998 | Nagata |
| 5,789,334 A | 8/1998 | Nakanishi |
| 5,789,464 A | 8/1998 | Müller |
| 5,805,264 A | 9/1998 | Janssen |
| 5,843,346 A | 12/1998 | Morrill |
| 5,849,810 A | 12/1998 | Müller |
| 5,874,127 A | 2/1999 | Winterton |
| 5,894,002 A | 4/1999 | Boneberger |
| 6,281,468 B1 | 8/2001 | Souel |
| 6,551,531 B1 | 4/2003 | Ford |
| 6,627,124 B1 | 9/2003 | Herbrechtsmeier |
| 6,800,225 B1 | 10/2004 | Hagmann |
| 6,849,210 B2 | 2/2005 | Bothe |
| 6,858,248 B2 | 2/2005 | Qiu |
| 6,881,269 B2 | 4/2005 | Matsuzawa |
| 7,078,074 B2 | 7/2006 | Matsuzawa |
| 7,384,590 B2 | 6/2008 | Kelly |
| 7,387,759 B2 | 6/2008 | Kelly |

FOREIGN PATENT DOCUMENTS

| | | |
|---|---|---|
| EP | 0472303 A2 | 2/1992 |
| EP | 0604176 A1 | 12/1993 |
| EP | 1245372 A2 | 10/2002 |
| WO | 8704390 A1 | 7/1987 |
| WO | 2004016405 A1 | 2/2004 |
| WO | 2010071691 A1 | 6/2010 |

OTHER PUBLICATIONS

PCT Written Opinion of the International Searching Authority dated Feb. 7, 2012, International Application No. PCT/US2011/061982, International Filing Date Nov. 23, 2011.

Authors: H. Yasuda, Name of Article: Glow Discharge Polymerization, Published: Journal of Polymer Science: Macromolecular Reviews (1981) vol. 16, 199-293.

Authors: N. Dilsiz and G Akovali, Name of Article: Plasma Polymerization of Selected Organic Compounds, Published: Polymer (1996) Vo. 37, No. 2, pp. 333-342.

LENS MOLDS HAVING ATMOSPHERIC PLASMA COATINGS THEREON

This application claims the benefit under 35 USC §119 (e) of U.S. provisional application No. 61/418,533 filed Dec. 1, 2010, incorporated herein by reference in its entirety.

The present invention relates generally to a process for producing ophthalmic lenses, in particular, silicone hydrogel contact lenses, using molds having hydrophobic coatings obtained according to atmospheric plasma deposition technique.

BACKGROUND OF THE INVENTION

Silicone hydrogel contact lenses can be manufactured economically in a mass production manner by a conventional cast-molding process involving disposable molds (e.g., PCT published patent application No. WO/87/04390, EP-A 0 367 513, U.S. Pat. No. 5,894,002, all of which are herein incorporated by reference in their entireties) or by an improved cast-molding process involving reusable molds and curing under a spatial limitation of actinic radiation (U.S. Pat. Nos. 5,508,317, 5,583,163, 5,789,464 and 5,849,810). A critical step in the production of lenses using molds is mold opening and lens releasing from the mold without damaging the lens. Subsequent to the completion of the contact lens molding process, the polymerized lens tends to strongly adhere to the mold. During mold opening and removing the contact lenses from the mold, cracks, flaws and/or tears may occur in the lenses or in the worst case the contact lenses even break totally. Contact lenses having such defects have to be discarded, resulting in lower production yield and higher production costs.

Various methods have been developed or proposed. One exemplary method is to hydrate the lens, namely, a lens-in-mold assembly after mold separation is placed in a hydration tank filled with water containing a surfactant (e.g., U.S. Pat. No. 5,264,161). However, the utilization of surfactants in a hydration bath does not provide a more effortless mold separation. Lens damage incurred during mold separation may not be minimized by hydrating lenses. Such method may not be easily implemented in a fully automated production line. Another exemplary method is to incorporate surfactants as internal mold releasing agents into molds as illustrated by U.S. Pat. No. 4,159,292. Incorporation of internal mold releasing agents in molds can decrease adhesion between lenses and molds. However, when a mold is used repeatedly, surfactants as internal mold releasing agent can be exhausted by exudation. A further exemplary method is to apply external mold releasing agents (e.g., surfactants) in the form of a film or coating onto to the molding surfaces of a mold (e.g., those disclosed in U.S. Pat. Nos. 4,929,707 and 5,542,978). When external mold releasing agents are used, a portion of the agents used for treating the molding surfaces of the mold can migrate to the surface and interior of the polymerized lens, which results in problems such as non-uniformity of the surface of the lens and turbidity. When a mold is used repeatedly, mold releasing treatment is required in each molding cycle. Such treatment can lower productivity in producing the lens. A still further exemplary method is to incorporate internal mold releasing agents into a lens-forming composition for making contact lenses. The internal mold releasing agent can be a surfactant (U.S. Pat. Nos. 4,534,916; 4,929,707; 4,946,923; 5,013,496; 5,021,503; 5,126,388; 5,594,088; and 5,753,730, herein incorporated by reference in their entireties) or a non-polymerizable polymer (U.S. Pat. No. 6,849,210, herein incorporated by reference in its entirety). By incorporation of an internal mold releasing agent in a lens-forming composition (or lens formulation), the adhesion between molds and lenses may be reduced, a relatively smaller force may be required to separate mold, and lenses may be removed from molds with less effort. However, for a specific lens material and/or a mold material, not all surfactants or polymers can be effective mold releasing agents for facilitating mold separation and lens removal from a mold, in particular, under conditions of high speed automated operations (i.e., the time interval between dosing a lens-forming material in a mold and curing the lens-forming material in the mold is relatively short, e.g., less than about 20 seconds). Although some mold releasing agents may be able to lower an averaged mold separation force for a given lens-forming material, individual mold separation forces may vary widely and become an uncontrollable factor that affects the product quality and yield. In addition, a non-crosslinkable polymer may be effective in reducing mold separation force but may have adverse effects on the properties of resultant lenses. For example, it may cause resultant lenses to be hazy and affect the refractive index of the resultant lenses. Furthermore, there are few known methods for selecting a non-polymerizable polymer as an effective mold releasing agent for a given lens-forming material.

Therefore, there still a need for a process for cast-molding contact lenses with an enhanced quality and enhanced yield achieved by reducing mold separation force and lens-mold adhesion.

SUMMARY OF THE INVENTION

The invention relates to a method for producing contact lenses, in particular, silicone hydrogel contact lenses. A method of the invention includes the steps of: comprises the steps of: (1) obtaining a mold for cast-molding contact lenses from a lens formulation, wherein the mold comprises a first mold half having a first molding surface and a second mold half having a second molding surface, wherein when the first and second mold halves are configured to receive each other such that a lens forming cavity is formed between the first molding surface and the second molding surface; (2) increasing the hydrophobicity of at least one of the first and second molding surfaces by air plasma treatment which is carried out by generating an atmospheric plasma flow from a working gas and introducing the atmospheric plasma flow to at least one of the first and second molding surfaces of the mold to form a plasma coating on the molding surface under treatment, wherein the coated molding surface has an average water contact angle greater than an untreated molding surface and has an average water contact angle of about 55 degrees or greater, preferably about 60 degrees or greater, even more preferably about 65 degrees or greater, most preferably about 70 degrees or greater; (3) introducing a lens formulation into the lens-forming cavity formed between the first and second molding surfaces at least one of which has the plasma coating thereon; (4) curing the lens formulation in the cavity to form an ophthalmic lens, preferably a contact lens, more preferably a silicone hydrogel contact lens; and (5) opening the mold and removing the molded ophthalmic lens (preferably contact lens, more preferably silicone hydrogel contact lenses), wherein the method is characterized by having a reduction in mold separation force ($\Delta F$ %) of at least about 40%, preferably at least about 50%, more preferably at least about 60%, even more preferably at least about 70%, wherein $\Delta F$ % is determined according to the formula of $$\Delta F\ \% = \frac{F_{untreated\ mold} - F_{treated\ mold}}{F_{untreated\ mold}} \times 100,$$

in which $F_{untreated\ mold}$ is the mold separation force measured when using the mold without any plasma-treated molding surface as control in cast-molding of a silicone hydrogel lens formulation, $F_{treated\ mold}$ is the mold separation force measured when using a mold having at least one plasma-treated molding surface in cast-molding of the same silicone hydrogel lens formulation.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DETAILED DESCRIPTION OF EXAMPLE EMBODIMENTS

Figure 1:
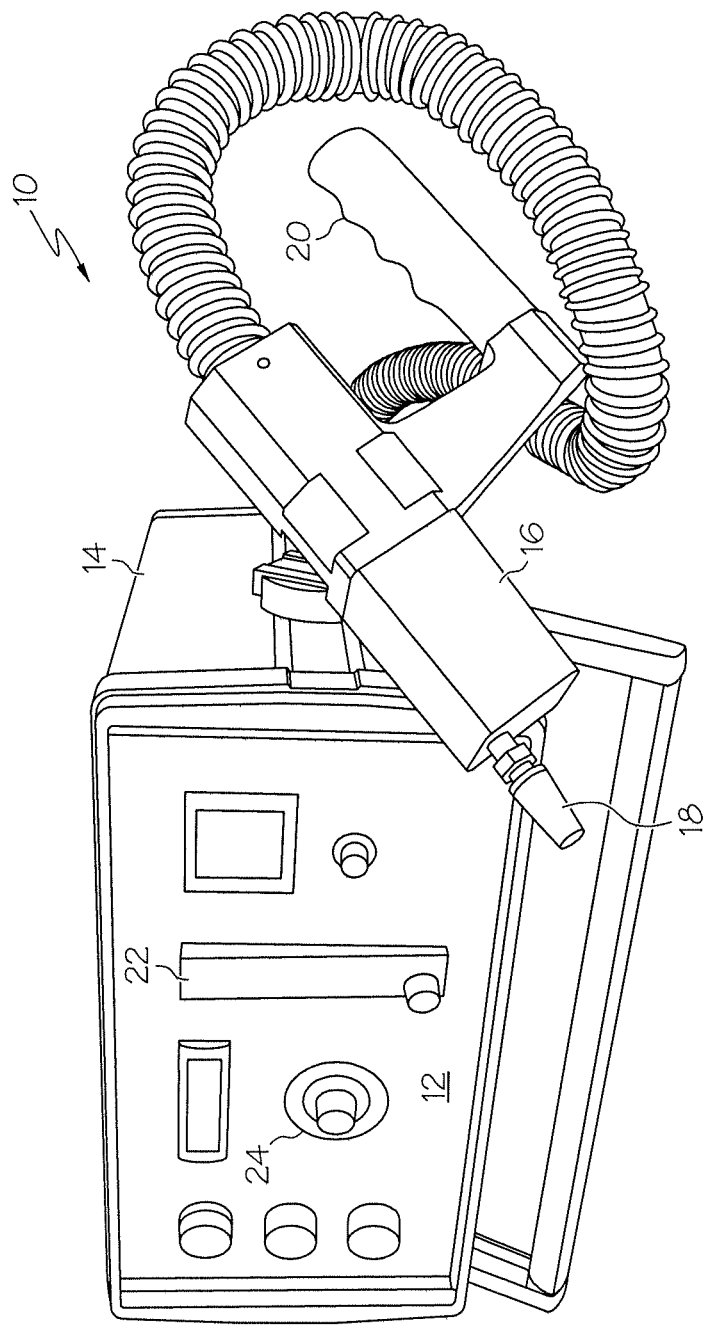
FIG. 1 is a perspective view of a plasma flow system to be used with an example embodiment of the present invention.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

As used in this application, the term "ophthalmic lens" refers to an intraocular lens, a contact lens (hard or soft), or a corneal onlay. "Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. As used in this application, the term "silicone hydrogel contact lens" refers to a contact lens comprising a silicone hydrogel material.

As used in this application, the term "hydrogel" or "hydrogel material" refers to a crosslinked polymeric material which is not water-soluble and can contains at least 10% by weight of water within its polymer matrix when fully hydrated.

As used in this application, the term "non-silicone hydrogel" refers to a hydrogel that is theoretically free of silicon.

As used in this application, the term "silicone hydrogel" refers to a hydrogel containing silicone. A silicone hydrogel typically is obtained by copolymerization of a polymerizable composition comprising at least one silicone-containing vinylic monomer or at least one silicone-containing vinylic macromer or at least one silicone-containing prepolymer having ethylenically unsaturated groups.

As used in this application, the term "vinylic monomer" refers to a compound that has one sole ethylenically unsaturated group and can be polymerized actinically or thermally.

As used in this application, the term "olefinically unsaturated group" or "ethylenically unsaturated group" is employed herein in a broad sense and is intended to encompass any groups containing at least one carbon-carbon double bond (C═C). Exemplary ethylenically unsaturated groups include without limitation acryloyl, methacryloyl, allyl, vinyl, styrenyl, or other C═C containing groups.

As used in this application, the term "hydrophilic vinylic monomer" refers to a vinylic monomer which as a homopolymer typically yields a polymer that is water-soluble or can absorb at least 10 percent by weight water.

As used in this application, the term "hydrophobic vinylic monomer" refers to a vinylic monomer which as a homopolymer typically yields a polymer that is insoluble in water and can absorb less than 10 percent by weight water.

As used in this application, the term "macromer" or "prepolymer" refers to a medium and high molecular weight compound or polymer that contains two or more ethylenically unsaturated groups. Medium and high molecular weight typically means average molecular weights greater than 700 Daltons.

As used in this application, the term "crosslinker" refers to a compound having at least two ethylenically unsaturated groups. A "crosslinking agent" refers to a crosslinker having a molecular weight of about 700 Daltons or less.

As used in this application, the term "water contact angle" refers to an average water contact angle (i.e., contact angles measured by Sessile Drop method), which is obtained by averaging measurements of contact angles.

As used in this application, the term "polymer" means a material formed by polymerizing/crosslinking one or more monomers or macromers or prepolymers.

As used in this application, the term "molecular weight" of a polymeric material (including monomeric or macromeric materials) refers to the weight-average molecular weight unless otherwise specifically noted or unless testing conditions indicate otherwise.

The term "fluid" as used herein indicates that a material is capable of flowing like a liquid.

The present invention is generally related to a process for making (cast nolding) ophthalmic lenses, preferably contact lenses, more preferably silicone hydrogel contact lenses. A process of the invention is partly based on discovery that an atmospheric plasma coating ("APC") or APC treatment deposition process can be used to increase the surface hydrophobicity of the molding surfaces of a mold for making an ophthalmic lens (preferably contact lens, more preferably a silicone hydrogel contact lens) and thereby to reduce a mold separation. The hydrophobicity of a molding surface of a mold can be characterized by water contact angle on the molding surface. For reference, an uncoated glass or quartz mold for making contact lenses typically has a water contact angle of less than about 10 degrees. It is found that when using the coated glass or quartz molds having a water contact angle of about 55 degrees or greater, preferably about 60 degrees or greater, even more preferably about 65 degrees or greater, most preferably about 70 degrees or greater to make silicone hydrogel contact lenses from a monomer lens formulation (or a fluid lens-forming material or composition) without mold releasing agent, the mold separation force can be very low. Molds with low separation force do not produce high percentages of lens tearing.

The term "increased surface hydrophobicity" in reference to a molding surface of a mold means that the treated molding surface of the mold has a water contact angle greater than the untreated molding surface of a mold (or that prior to plasma treatment).

A method of the invention for producing ophthalmic lenses, preferably contact lenses, more preferably silicone hydrogel contact lenses, comprises the steps of: (1) obtaining a mold for cast-molding contact lenses from a lens formulation, wherein the mold comprises a first mold half having a first molding surface and a second mold half having a second molding surface, wherein when the first and second mold halves are configured to receive each other such that a lens forming cavity is formed between the first molding surface and the second molding surface; (2) increasing the hydrophobicity of at least one of the first and second molding surfaces by air plasma treatment which is carried out by generating an atmospheric plasma flow from a working gas and introducing the atmospheric plasma flow to at least one of the first and second molding surfaces of the mold to form a plasma coating on the molding surface under treatment, wherein the coated molding surface has an average water contact angle greater than an untreated molding surface and has an average water contact angle of about 55 degrees or greater, preferably about 60 degrees or greater, even more preferably about 65 degrees or greater, most preferably about 70 degrees or greater; (3) introducing a lens formulation into the lens-forming cavity formed between the first and second molding surfaces at least one of which has the plasma coating thereon; (4) curing the lens formulation in the cavity to form an ophthalmic lens, preferably a contact lens, more preferably a silicone hydrogel contact lens; and (5) opening the mold and removing the molded ophthalmic lens (preferably contact lens, more preferably silicone hydrogel contact lenses), wherein the method is characterized by having a reduction in mold separation force ($\Delta F$ %) of at least about 40%, preferably at least about 50%, more preferably at least about 60%, even more preferably at least about 70%, wherein $\Delta F$ % is determined according to the formula of $$\Delta F \% = \frac{F_{untreated\ mold} - F_{treated\ mold}}{F_{untreated\ mold}} \times 100,$$

in which $F_{untreated\ mold}$ is the mold separation force measured when using the mold without any plasma-treated molding surface as control in cast-molding of a silicone hydrogel lens formulation, $F_{treated\ mold}$ is the mold separation force measured when using a mold having at least one plasma-treated molding surface in cast-molding of the same silicone hydrogel lens formulation.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

In a conventional cast-molding process where a mold is used only once (i.e., disposable or single use), the first and second molding surface of a mold are pressed against each other to form a circumferential contact line which defines the edge of a result contact lens. Because the close contact of the molding surfaces can damage the optical quality of the molding surfaces, the mold cannot be reused. In contrast, in a Lightstream Technology™, the edge of a resultant contact lens is not defined by the contact of the molding surfaces of a mold, but instead by a spatial limitation of radiation. Without any contact between the molding surfaces of a mold, the mold can be used repeatedly to produce high quality contact lenses with high reproducibility.

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. A spatial limitation of UV radiation is obtained by using a mask or screen having a radiation (e.g., UV) permeable region, a radiation (e.g., UV) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV radiation) having a cross-sectional profile defined by the projection contour of the mask or screen. The projected beam of radiation (e.g., UV radiation) limits radiation (e.g., UV radiation) impinging on a lens-forming material located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV beam (i.e., a spatial limitation of radiation). The radiation used for the crosslinking is a radiation energy, especially UV radiation, gamma radiation, electron radiation or thermal radiation, the radiation energy preferably being in the form of a substantially parallel beam in order on the one hand to achieve good restriction and on the other hand efficient use of the energy.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S.

Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In a preferred embodiment, reusable molds are used and the silicone-hydrogel lens-forming composition is cured actinically under a spatial limitation of actinic radiation to form a SiHy contact lens. Examples of preferred reusable molds are those disclosed in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc.

Atmospheric plasma is typically understood to be plasma sustained at a surrounding atmospheric pressure and can be produced by atmospheric pressure discharges. Example atmospheric pressure discharges include arc discharge, which is a high power thermal discharge of very high temperature (i.e., about 10,000K). Arc discharge can be generated using various power supplies and is commonly used in metallurgical processes. For example, arc discharge is used to melt rocks containing $Al_2O_3$ to produce aluminum. Corona discharge is another atmospheric pressure discharge that is a non-thermal discharge generated by the application of high voltage to sharp electrode tips. Corona discharge is commonly used in ozone generators and particle precipitators. A further atmospheric pressure discharge is a dielectric barrier discharge (DBD), which is a non-thermal discharge generated by the application of high voltages across small gaps wherein a non-conducting coating prevents the transition of the plasma discharge into an arc. DBD is widely used in the web treatment of fabrics because the application of DBD to synthetic fabrics and plastics functionalizes the surface and allows for paints, glues and similar materials to adhere.

The example APC process utilizes a plasma treatment system (e.g., PT-2000 and PT-2000P manufactured by Tri-Star Technologies) including a plasma generator and a plasma nozzle. As shown in FIG. 1, an example plasma treatment system 10 includes a system control panel 12, a plasma generator 14, a plasma electrode 16, a plasma nozzle 18 and a handle 20. The plasma generator 14 includes a power supply, gas flow controller 22 and a power amplifier 24. The plasma generator 14 feeds electrical signals with specific amplitude, frequency and form factor to the primary winding of high voltage transformer. The generator 14 can produce a continuous stream of plasma. Alternatively, appropriately shaped electrical pulses with a defined amplitude and frequency produced by the transformer secondary winding are applied to the plasma electrode 16. An example power supply subassembly includes an AC inlet connector, an AC filter, a predefined ampere fuse and a DC power supply that is used for the gas controller. Preferably, the system control panel 12 allows an operator to change system parameters, such as carrier gas (e.g., inert gas) flow, plasma intensity and exposure time, and monitor system errors. Additionally, the example system control panel 12 includes a timer (not shown) that allows a user to set a precise exposure time.

In use with the example plasma treatment system 10, plasma jets exit the nozzle 18 and reach a substrate to then spread over the substrate surface. The plasma jets preferably exit the nozzle 18 at atmospheric pressure. If the substrate is two-sided, a user can turn the substrate over with tweezers and coat the opposing surface with the plasma jet. The example plasma treatment system 10 can alternatively generate a uniform plasma cloud that completely surrounds, or spreads over, the boundary layer of a substrate surface. The example plasma cloud can occupy a finite volume of space filled with a gas at a defined temperature (e.g., about room temperature).

The plasma typically exists in the surface boundary layer in the vicinity of the nozzle 18 and abruptly decays due to contact with air. A carrier gas (e.g., inert gas: helium, argon or xenon) can, therefore, be introduced to extend or sustain the coverage of the plasma onto the substrate surface. When a charged particle of the plasma collides with an atom of the introduced carrier gas, the charged particle can either ionize to produce another charged particle (i.e., electron and ion) or move apart from the atom. A relative concentration of ions and electrons in the plasma can be on the order of about 1 ppm. Therefore, a very minute percentage of the carrier gas can be involved in the treatment process. Alternatively, a small amount of reagent gases and/or gas mixtures (e.g., air, acetylene, oxygen etc.) can be added into the plasma flow in order to more permanently coat a substrate surface with a coating process.

Figure 2:
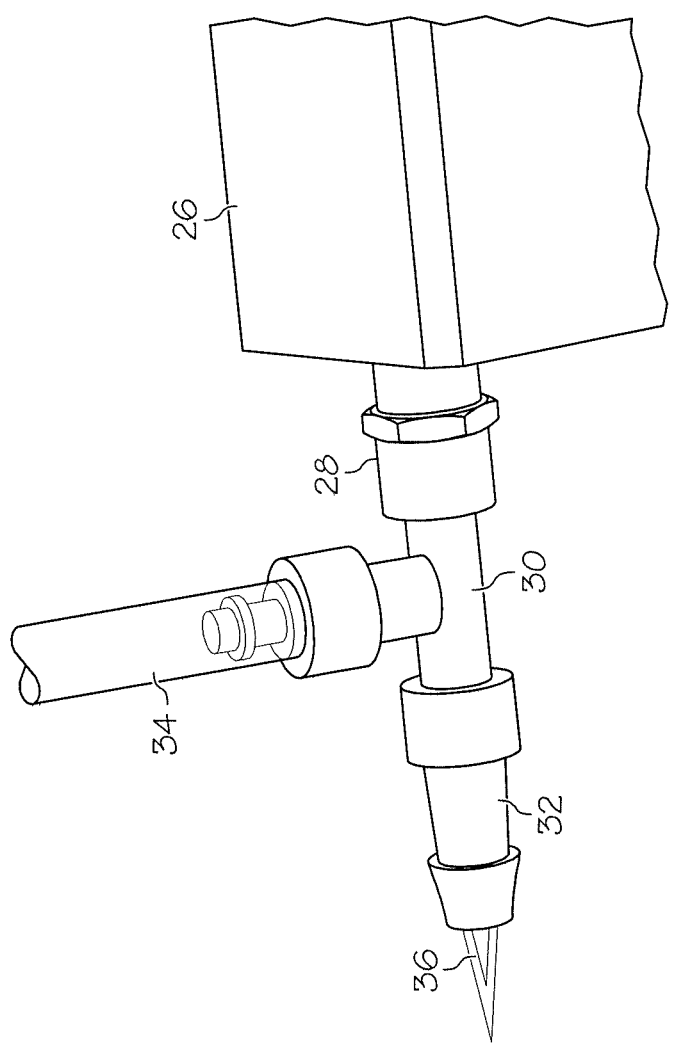
FIG. 2 is a perspective view of a plasma nozzle to be used with an example embodiment of the present invention.

FIG. 2 shows an alternate system for introducing such a gaseous mixture (working gas) into the plasma flow. As shown, an example system includes a plasma electrode 26 connected to a nozzle 32 through an adaptor 28. And, an additional reagent gas mixture line 34 introduces reagent gas to the plasma flow within the nozzle 32 through a connector 30. The reagent gas mixture line 34 preferably provides a reagent gas from a flow meter separate from the system. In use, the plasma jet 36 exiting the nozzle 32 additionally includes a carrier gas. An example plasma jet 36 exiting the nozzle 32 can include a reagent gas mixture during a coating procedure. When the jet 34 contacts a substrate surface, the gaseous reagent and plasma spreads over a thin boundary layer.

Figure 3:
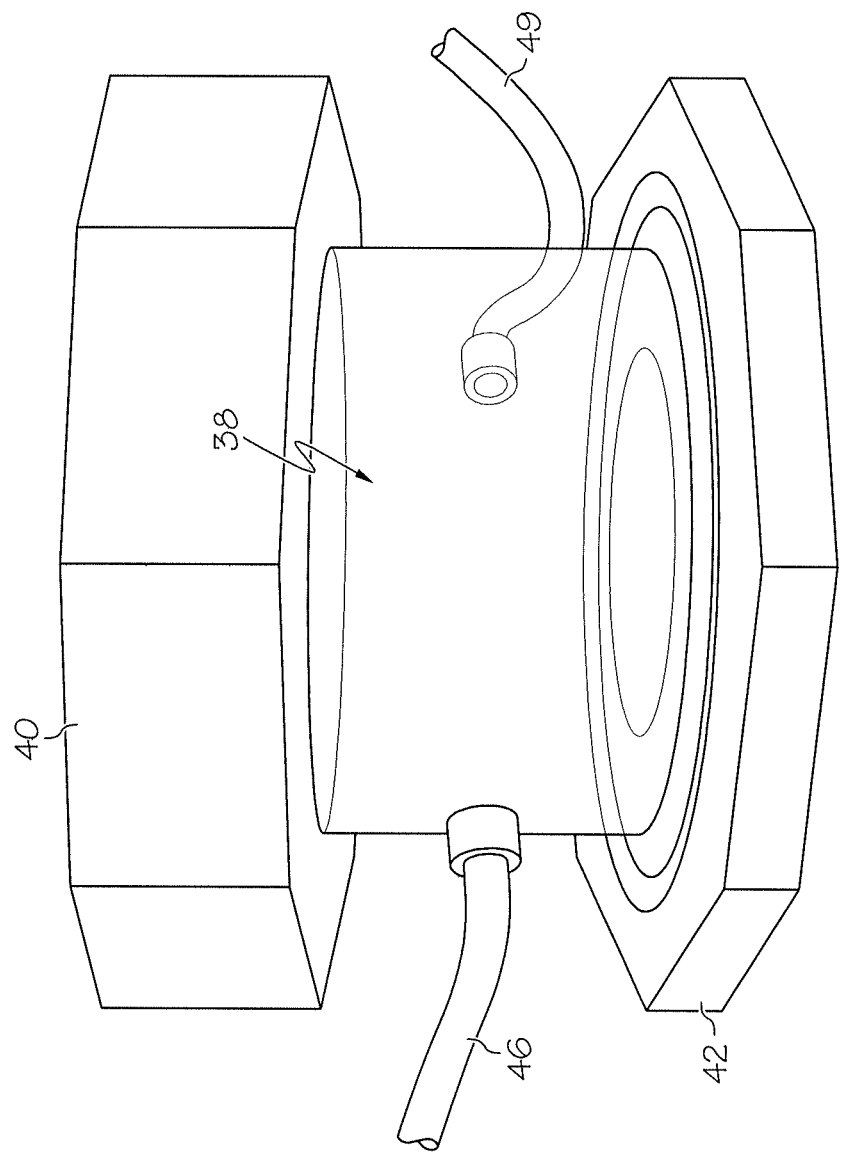
FIG. 3 is a perspective view of a chamber to be used with an example embodiment of the present invention.
Figure 4:
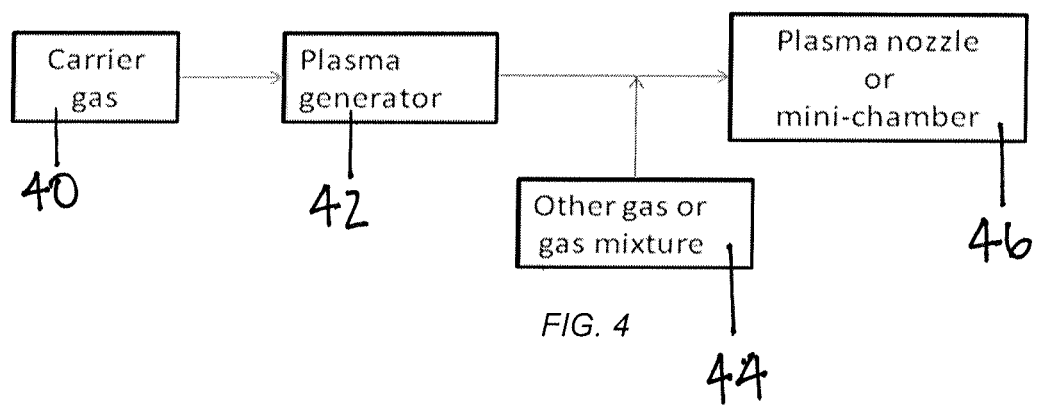
FIG. 4 is a schematic diagram of a method for controlling the surface properties of a substrate.

The APC plasma treatment or coating process can alternatively occur within a chamber 38 operable between two insulated metal electrodes 40, 42. The chamber 38 can be defined by a shell or housing. An example chamber 38 can include a gas-in conduit (or valve) 49 and a gas-out conduit (or valve) 46 to regulate flow, pressure and concentration of plasma gas within the chamber (FIG. 3). The gas-in conduit 49 can be adapted to connect, and receive plasma from, to the plasma nozzle of the plasma system (FIGS. 1 and 2). Alternatively, the gas-in conduit 49 can be adapted to connect to, and receive plasma from, a separate plasma delivery source (e.g., plasma generator). The gas-out conduit 46 releases plasma from the chamber 38. The chamber 38 housing can have a shape resembling a cylinder with open ends and it can also have other shapes. The open ends can be sealed with the insulated metal electrodes 40, 42. The example chamber 38 housing is constructed of an impermeable material (e.g., glass or plastic). The substrate to-be-coated can be secured within the chamber 38 such that plasma flowing through the chamber spreads across all surfaces of the substrate. The volume of the exemplary chamber 38 can be varied based upon the size of the substrate to be treated or coated, or based on the power of the plasma controller.

The exemplary APC process can be carried out using a consistent plasma cloud that can be generated by a nozzle or filling a chamber by incorporating a reagent gas mixture. Alternatively, the APC process can be carried out by using a pulsed mode of plasma coating. In the pulsed plasma mode, the plasma is pulsed according to preset intervals manipulated by the power source. Example pulse intervals used can include a range of between about 0.1 millisecond and 3 milliseconds, and more preferably about 1 millisecond.

A working gas is understood as meaning the composition of a gas or mixture of gases before it is converted into a plasma state. For APC treatment, an example working gas can include an inert gas. For APC coating, an example working gas can include both an inert carrier gas and a reagent gas. A working gas is typically produced by volatilizing an organic compound which has been placed in a storage vessel at room temperature and under normal pressure. If the compound is a gas, the gas can be mixed to produce the working gas. If the compound is a liquid, the liquid is volatilized to produce the working gas. A compound can be volatilized by applying a vacuum to, and thermostatically controlling, the storage vessel containing the compound. The storage vessel is typically connected to the plasma reactor by a controllable inlet valve.

Exemplary organic compounds and/or gases usable with the system and method of the present invention include alkylsilane, dialkylsilane, trialkylsilane, tetraalkylsilane, fluorinated alkylsilane, fluorinated dialkylsilane, fluorinated trialkylsilane, fluorinated tetraalkylsilane, alkoxy silane, dialkoxy silane, trialkoxy silane, tetraalkoxy silane, fluorinated alkoxy silane, fluorinated dialkoxy silane, fluorinated trialkoxy silane, fluorinated tetraalkoxy silane, and mixtures thereof. Preferably, a working gas for plasma-treating a molding surface of a mold is tetraethoxysilane, fluorinated alkylsilane, fluorinated dialkylsilane, fluorinated trialkylsilane, fluorinated tetraalkylsilane, or a combination thereof.

Contact lens molds can be coated with the APC process to minimize contact lens defects through reduction of mold separation force during mold opening process. Exemplary molds can be glass or quartz or plastics molds, especially reusable molds. Coating of the lens mold allows the mold to be used without a typical mold release agent to remove a lens once the lens forming process is completed.

Average water contact angles (i.e., sessile drop) on a molding surface of a mold can be measured using a contact angle measurement device, for example a VCA Optima manufactured by AST, Inc., of Boston, Mass. This equipment is capable of measuring advancing or receding contact angles or sessile (static) contact angles. The measurements are performed on the molding surface of a mold half (e.g., female or male mold half or both). The mold half is then mounted on the contact angle measurement pedestal, and the sessile drop contact angle is measured using the software provided by the manufacturer. The DI water used for measuring the contact angle has a resistivity greater than about 18 MΩcm and the droplet volume used is about 2 μl. Typically, a glass or quartz mold half has a sessile drop contact angle of about 10 degrees or less.

A thin film produced by plasma deposition typically can have a thickness in the range from 1 to 800 nm, preferably of 5 to 500 nm and, more preferably, of 10 to 250 nm. Such a thickness of a hydrophilic film produced by plasma deposition can be controlled by the residence time of the substrate (mold) in the presence of plasma nozzle jet or by the throughput in the reactor chamber. The thickness of the film can also be increased or decreased by altering the power, time and flow of the plasma jet.

A silicone hydrogel (SiHy) contact lens formulation for cast-molding or spin-cast molding of contact lenses generally comprises at least one components selected from the group consisting of a silicone-containing vinylic monomer, a silicone-containing vinylic macromer, a silicone-containing prepolymer, a hydrophilic vinylic monomer, a hydrophobic vinylic monomer, a crosslinking agent (a compound having a molecular weight of about 700 Daltons or less and containing at least two ethylenically unsaturated groups), a free-radical initiator (photoinitiator or thermal initiator), a hydrophilic vinylic macromer/prepolymer, and combination thereof, as well known to a person skilled in the art. A SiHy contact lens formulation can also comprise other necessary components known to a person skilled in the art, such as, for example, a UV-absorbing agent, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art.

In accordance with the invention, a SiHy lens formulation can be a solution or a melt at a temperature from about 20° C. to about 85° C. Preferably, a polymerizable composition is a solution of all desirable components in a suitable solvent, or a mixture of suitable solvents.

A SiHy lens formulation can be prepared by dissolving all of the desirable components in any suitable solvent, such as, water, a mixture of water and one or more organic solvents miscible with water, an organic solvent, or a mixture of one or more organic solvents, as known to a person skilled in the art.

Example of preferred organic solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3, 4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methylpyrrolidinone, and mixtures thereof.

Numerous SiHy lens formulations have been described in numerous patents and patent applications published by the filing date of this application. All of them can be used in a method of the invention. A SiHy lens formulation for making commercial SiHy lenses, such as, lotrafilcon A, lotrafilcon B, balafilcon A, galyfilcon A, senofilcon A, narafilcon A, narafilcon B, comfilcon A, enfilcon A, asmofilcon A, filcon II 3, can also be used in a method of the invention.

Example 1: Coating on Molds

A Tetraethoxysilane (TEOS) bubbler is purchased from Gelest and connected to the atmospheric plasma system. Reusable glass molds similar to the molds shown in FIGS. 1-6 in U.S. Pat. Nos. 7,384,590 and 7,387,759 (FIGS. 1-6) are coated. The plasma-treated (coated) molding surfaces of glass molds have a contact angle of about 65 degrees, as compared to less than about 10 degrees for the non-plasma-treated (coated) molding surfaces of glass molds. The coating on the glass molds is tested for its ability to help to minimize the mode separation force, when using a silicone hydrogel lens formulation that does not contain mold release agent.

|  |  |  |  |  |  |  |  |  |
|---|---|---|---|---|---|---|---|---|
| Group 1 | 20 | 21 | 119 | 213 | 25 | 21 | 23 | 22 | 20 |
| Group 2 | 23 | 26 | 23 | 20 | 21 | 21 | 22 | 21 | 20 |

Example 2: Package Shell Treatment by Atmospheric Plasma

Polypropylene (PP) package shells are treated with atmospheric argon plasma and the surface wettability of the treated shells is evaluated by using Acudyne test. The plasma set-up includes a Tri-Star plasma generator (PT-2000P) and a ¼ inch plastic nozzle. Distance between shell and plasma nozzle is adjusted to 1 mm or 3 mm. Plasma intensity tested ranges from 60% to 90% or to 99%. Ar flow rates: 30, 40, and 50 SCFH. $O_2$ flow rates: 8. Treatment times: 4 sec, 10 or 30 sec After plasma treatment, the wettability of the shell surface increase as indicated by a decrease of surface tension. This is tested by using Accudyne solutions with different surface tension (35, 40, 45, 50 and 60 dyne). The Accudyne solution would spread on a treated surface with similar or lower surface tension and would bead up on a treated surface of higher surface tension. Significant improvement in wettability is obtained when shells are treated, for example, for about 30 seconds at plasma intensity of 90 and Argon flow rate of 30SCFH. No significant difference is observed between argon plasma vs. argon/$O_2$ plasma.

| Conditions: | Treatment time (sec) | Surface tension of Accudyne solution (dynes) | | | | |
|---|---|---|---|---|---|---|
| | | 35 | 40 | 45 | 50 | 60 |
| Untreated | | beading | beading | Beading | beading | beading |
| Ar flow rate = 30 SCFH*, 1.50 current, distance = 3 mm | 3 | beading | NA | Slight beading | NA | beading |
| Ar flow rate = 30 SCFH, 1.50 current, distance = 3 mm | 10 | ok | NA | Beading | NA | beading |
| Ar flow rate = 30 SCFH, 1.50 current, distance = 1 mm | 10 | slight beading | NA | slight beading | NA | slight beading |
| Ar flow rate = 40 SCFH, 1.50 current, distance = 1 mm | 10 | slight beading | NA | slight beading | NA | slight beading |
| Ar flow rate = 50 SCFH, 2.38 current, plasma intensity = 99, | 10 | OK | OK | OK | OK | OK |
| Ar flow rate = 50 SCFH, 2.38 current, plasma intensity = 99, | 3 | OK | beading | beading | beading | beading |
| Ar flow rate = 30 SCFH, 2.38 current, plasma intensity = 99, | 3 | OK | OK | OK | OK | OK |
| Ar flow rate = 30 SCFH, 1.47 current, plasma intensity = 69, | 10 | OK | OK | Beading | Beading | Beading |
| Ar flow rate = 30 SCFH, 1.47 current, plasma intensity = 69, | 30 | OK | OK | OK | OK | OK |
| Ar flow rate = 50 SCFH, 1.47 current, plasma intensity = 69, | 10 | OK | OK | Slight beading | Slight beading | Slight beading |
| Ar flow rate = 30 SCFH, 2.39 current, plasma intensity = 99, | 5 | OK | Beading | Beading | Beading | Beading |
| Ar flow rate = 30 SCFH, 2.67 current, plasma intensity = 99, | 15 | OK | OK | Beading | Beading | Beading |
| Ar flow rate = 30 SCFH, plasma intensity = 90, | 3 | OK | OK | Beading | Beading | Beading |
| | 4 | OK | OK | Slight Beading | Beading | Beading |
| | 30 | OK | OK | OK | OK | OK |

When using the coated molds to make lenses from silicone hydrogel lens formulations described in Examples 6 and 7 of WO2010071691 (herein incorporated by reference in its entirety), without mold release agent, the mold separation force is very low (in the low 20s as compared to more than 100 for uncoated molds). No star tears are observed for lenses with low mold separation force. The following table is a representation of mold separation forces for 18 lenses made from using two coated glass molds.

While the invention has been described with reference to preferred and example embodiments, it will be understood by those skilled in the art that a variety of modifications, additions and deletions are within the scope of the invention, as defined by the following claims.

What is claimed is:

1. A method for producing ophthalmic lenses, comprising the steps of:

(1) obtaining a mold for cast-molding contact lenses from a lens formulation, wherein the mold comprises a first mold half having a first molding surface and a second mold half having a second molding surface, wherein when the first and second mold halves are configured to receive each other such that a lens forming cavity is formed between the first molding surface and the second molding surface;

(2) increasing the hydrophobicity of at least one of the first and second molding surfaces by air plasma treatment which is carried out by generating an atmospheric plasma flow from a working gas and introducing the atmospheric plasma flow to at least one of the first and second molding surfaces of the mold to form a plasma coating on the molding surface under treatment, wherein the coated molding surface has an average water contact angle greater than an untreated molding surface and has an average water contact angle of about 65 degrees or greater;

(3) introducing a lens formulation into the lens-forming cavity formed between the first and second molding surfaces at least one of which has the plasma coating thereon;

(4) curing the lens formulation in the cavity to form an ophthalmic lens; and (5) opening the mold and removing the molded ophthalmic lens, wherein the method is characterized by having a reduction in mold separation force (ΔF %) of at least about 40%, wherein ΔF % is determined according to the formula of $$\Delta F \% = \frac{F_{untreated\ mold} - F_{treated\ mold}}{F_{untreated\ mold}} \times 100,$$

in which $F_{untreated\ mold}$ is the mold separation force measured when using the mold without any plasma-treated molding surface as control in cast-molding of a silicone hydrogel lens formulation, $F_{treated\ mold}$ is the mold separation force measured when using a mold having at least one plasma-treated molding surface in cast-molding of the same silicone hydrogel lens formulation.

2. The method of claim 1, wherein the working gas comprises at least one member selected from the group consisting of alkylsilane, dialkylsilane, trialkylsilane, tetraalkylsilane, fluorinated alkylsilane, fluorinated dialkylsilane, fluorinated trialkylsilane, fluorinated tetraalkylsilane, alkoxy silane, dialkoxy silane, trialkoxy silane, tetraalkoxy silane, fluorinated alkoxy silane, fluorinated dialkoxy silane, fluorinated trialkoxy silane, fluorinated tetraalkoxy silane, and mixtures thereof.

3. The method of claim 1, wherein the working gas comprises at least one member selected from the group consisting of tetraethoxysilane, fluorinated alkylsilane, fluorinated dialkylsilane, fluorinated trialkylsilane, fluorinated tetraalkylsilane, or a combination thereof.

4. The method of claim 1, wherein the mold is a reusable mold made of glass or quartz.

5. The method of claim 1, wherein the mold is disposable mold made of a plastic material.

6. The method of claim 1, wherein the working gas further comprises a carrier gas comprising at least one inert gas selected from the group consisting of argon, helium, xenon and combinations thereof.

7. The method of claim 1, wherein the ophthalmic lens is a silicone hydrogel contact lens.

8. The method of claim 2, wherein the mold is a reusable mold made of glass or quartz.

9. The method of claim 3, wherein the mold is a reusable mold made of glass or quartz.

10. The method of claim 2, wherein the mold is disposable mold made of a plastic material.

11. The method of claim 3, wherein the mold is disposable mold made of a plastic material.

12. The method of claim 7, wherein the working gas further comprises a carrier gas comprising at least one inert gas selected from the group consisting of argon, helium, xenon and combinations thereof.

13. The method of claim 8, wherein the working gas further comprises a carrier gas comprising at least one inert gas selected from the group consisting of argon, helium, xenon and combinations thereof.

14. The method of claim 9, wherein the working gas further comprises a carrier gas comprising at least one inert gas selected from the group consisting of argon, helium, xenon and combinations thereof.

15. The method of claim 10, wherein the working gas further comprises a carrier gas comprising at least one inert gas selected from the group consisting of argon, helium, xenon and combinations thereof.

16. The method of claim 7, wherein the ophthalmic lens is a silicone hydrogel contact lens.

17. The method of claim 12, wherein the ophthalmic lens is a silicone hydrogel contact lens.

18. The method of claim 13, wherein the ophthalmic lens is a silicone hydrogel contact lens.

19. The method of claim 14, wherein the ophthalmic lens is a silicone hydrogel contact lens.

20. The method of claim 15, wherein the ophthalmic lens is a silicone hydrogel contact lens.

* * * * *